US011963593B2

(12) United States Patent
Uribe

(10) Patent No.: US 11,963,593 B2
(45) Date of Patent: Apr. 23, 2024

(54) STRAP ATTACHABLE ACCESSORY TETHER APPARATUS AND METHOD OF USE

(71) Applicant: NORIAN INNOVATIONS, INC., Arvada, CO (US)

(72) Inventor: Bobbie Uribe, Arvada, CO (US)

( * ) Notice: Subject to any disclaimer, the term of this patent is extended or adjusted under 35 U.S.C. 154(b) by 607 days.

(21) Appl. No.: 17/169,719

(22) Filed: Feb. 8, 2021

(65) Prior Publication Data

US 2022/0248823 A1 Aug. 11, 2022

(51) Int. Cl.
*A45C 13/00* (2006.01)
*A61J 17/00* (2006.01)

(52) U.S. Cl.
CPC .......... *A45C 13/001* (2013.01); *A61J 17/1115* (2020.05)

(58) Field of Classification Search
CPC .... A45C 13/001; A45C 15/00; A61J 17/1115; A45F 2003/003
USPC .......................................................... 248/343
See application file for complete search history.

(56) References Cited

U.S. PATENT DOCUMENTS 3,085,610 A 4/1963 Vardan
3,184,883 A 5/1965 McCook
4,765,037 A 8/1988 Perry
4,881,746 A 11/1989 Andreesen
5,672,088 A 9/1997 Chininis
5,702,039 A 12/1997 Olaiz
5,730,340 A 3/1998 Bosic
5,878,672 A * 3/1999 Ostermann ............ B60N 3/004 297/188.06
5,980,888 A 9/1999 Nolan-Brown
6,113,454 A 9/2000 Mitchell
6,343,968 B1 2/2002 Louie et al.
6,606,768 B2 8/2003 Henry et al.
D481,766 S 11/2003 Kanahele et al.
D512,107 S 11/2005 Kanahele et al.
7,104,861 B2 9/2006 Kanahele et al.
7,204,468 B2 4/2007 Kintzele et al.
D610,656 S 2/2010 Terrell
7,896,297 B1 3/2011 Simone
(Continued)

FOREIGN PATENT DOCUMENTS

CN 100558277 C * 11/2009 ............. A47D 13/02
EP 2501449 B1 * 5/2017 ........... A63H 33/006

*Primary Examiner* — Kimberly T Wood
(74) *Attorney, Agent, or Firm* — WILLIAMS INTELLECTUAL PROPERTY; Ben Williams

(57) ABSTRACT

A strap attachable accessory tether apparatus and method of use is presented. The strap attachable accessory tether apparatus depends a plurality of accessories useful for diverting infants in childcare from a dorsal side thereof. Accessories are attachable at distal ends of ribbon-like tether members. The ribbon-like tether members are connected to clip members at proximal ends thereof. The tether members are connected to the apparatus by threading the corresponding clip member through a corresponding elongate aperture for engagement with a corresponding anchor member disposed upon a basal side of the apparatus. Force directed to the distal ends is distributed into the apparatus along rims of the apertures and the clip members are uncoupled from the anchor members only by upward movement of the proximal end in a direction away from the corresponding aperture.

9 Claims, 5 Drawing Sheets

(56) References Cited

U.S. PATENT DOCUMENTS

| | | | | |
|---|---|---|---|---|
| 8,460,053 | B2 | 6/2013 | Fair et al. | |
| 8,882,557 | B2 | 11/2014 | Fair et al. | |
| 9,603,439 | B2 | 3/2017 | Nakamura | |
| 9,756,960 | B2 | 9/2017 | Alegria | |
| 2004/0077269 | A1 | 4/2004 | Oren et al. | |
| 2005/0170743 | A1 | 8/2005 | Wells | |
| 2005/0176341 | A1 | 8/2005 | Watt | |
| 2006/0168766 | A1 | 8/2006 | Lippincott | |
| 2006/0183397 | A1 | 8/2006 | Kanahele et al. | |
| 2007/0187560 | A1 | 8/2007 | Prime | |
| 2008/0064290 | A1 | 3/2008 | Castellani | |
| 2008/0149672 | A1 | 6/2008 | Frauhiger | |
| 2008/0230658 | A1 | 9/2008 | Waits et al. | |
| 2008/0248713 | A1 | 10/2008 | Mulrine et al. | |
| 2008/0251553 | A1 | 10/2008 | Goldstone et al. | |
| 2009/0000083 | A1 | 1/2009 | Richard et al. | |
| 2012/0041487 | A1 | 2/2012 | Griffis | |
| 2012/0113760 | A1 | 5/2012 | Pagrani | |
| 2012/0276805 | A1 | 11/2012 | Muscarella | |
| 2012/0284968 | A1 | 11/2012 | Johnson | |
| 2015/0201761 | A1 | 7/2015 | Wollenberg | |
| 2015/0224032 | A1* | 8/2015 | Dierker | A41B 13/04<br>606/236 |
| 2015/0245981 | A1* | 9/2015 | Barber | A61J 17/00<br>606/235 |
| 2018/0037385 | A1* | 2/2018 | Maas | A47G 25/005 |

* cited by examiner

STRAP ATTACHABLE ACCESSORY TETHER APPARATUS AND METHOD OF USE

BACKGROUND OF THE INVENTION

Most caregivers in the developed world know the amount of accoutrements and accessories that are typically required to accompany infants throughout the modern environment. A panoply of items is often required, from bottles and feeding accessories, to pacifiers, teethers, and other toys and items that are desirable to divert baby's attention, stimulate perception and develop eye-hand coordination. These items are additional to other necessaries, such as spare diapers, a change of clothing, milk or other foodstuffs, and the like, which are typically ported in a "baby bag" or other tote devised for the purpose.

Often, when moving through the modern world, such accoutrements and accessories need to be carried in a way that renders them accessible when needed, while being stored so that the caregiver's hands are able to interact with the world and maintain close contact with the infant, yet within reach for access when needed, without the caregiver having to carry each item individually or switch between them manually, or retrieve them from separate storage compartments maintained about the person.

It is also preferable that some such items are tethered to the caregiver so that, if the infant drops one in-use, it is prevented from contacting the ground (and becoming contaminated thereby) or worse, getting lost.

The present invention addresses these issues by providing a strap attachable accessory tether apparatus devised to readily fasten to a strap of an existing tote and present a dorsal surface from which a plurality of tether members may be disposed to connect with such toys, teethers, pacifiers, and other items, to maintain them immediately accessible without a caregiving having to doff the tote to access the items when desirable. The present invention further relates to a method of tethering and porting the tethered items.

FIELD OF THE INVENTION

The present invention relates to a strap attachable accessory tether apparatus that releasably secures a base member around the strap of a tote for securing accoutrements and accessories typical of child care such as toys, teethers, pacifiers, feeders, and other such items usefully ported tethered about a caregiver to prevent contact with the ground if dropped in-use by the infant or child, and yet maintained within reach to remain readily accessible when not in-use.

The present invention further relates to a method of tethering such items to the base member wherein the tether member is insertable through an aperture disposed in the base member, from a dorsal side to a basal side of the base member, and then turned at a right angle to engage to an anchor member diopsed upon the basal side in proximal association with the said aperture. Weight or force applied to the tether member is therefore borne on the aperture and distributed into the base member at the point of contact through the aperture, as well as borne upon the anchor member, whereby the tether is more securely engaged to the base member and separation of the tether member from the anchor member is less likely.

SUMMARY OF THE INVENTION

The present strap attachable accessory tether apparatus and associated method of use have been devised to enable convenient portage of a range of small handheld accoutrements and accessories often required in childcare for young infants. Since a caregiver typically must carry an infant, or otherwise pilot a walker or other device in which the infant is conveyed, access to teethers, pacifiers, toys, and other handheld items is desirably convenienced. The present apparatus further increases hygiene by preventing the accessories from contacting the ground.

Many means of tethering such items about or proximal a person are known in the art. Most allow for releasable attachment of an item to a structure, carriage, or conveyance to depend a toy therefrom. The present invention, however, presents useful improvements over the art in question by providing a generally planar base member, of some thickness, that is releasably attachable to a variety of objects and structures, to distribute force applied to items attached to the base member into the said base member proper, as well as to an associated anchor member, for more secure attachment thereto.

To accomplish this, the base member includes at least one elongate aperture disposed thereupon, said aperture disposed from a dorsal side of the base member through to a basal side of the base member. An associated tether member, which may be ribbon-like and therefore embody some width as well as length, is attachable to a clip member which is sized particularly to fit through the elongate aperture and couple with an anchor member disposed upon the basal side of the base member. The tether member is threaded through the aperture and turned through a right angle to connect to the anchor member disposed upon the basal side of the base member.

Force applied to the tether member is therefore distributed through the tether member against the surrounding rim of the aperture, and upon the basal side of the base member where contacted by the tether member and thus into the base member proper, as well as through the tether member to the anchor member on the basal side. Further, in at least one embodiment contemplated herein, the clip member is generally triangular in shape, with a connecting portion disposed at a vertex thereof, whereby force directed to pull on the tether member serves to further engage the connecting portion against the anchor member.

Force applied to the anchor member, while nonetheless distributed at the aperture and attenuated some thereby, is also applied transversely upon the anchor member, at a point immediately in contact and in parallel with the surface of the basal side. Such transverse forcing pulls the connecting portion of the clip member around the anchor member into more taut contact therewith and, unless sufficient force be somehow applied as to tear the anchor member out of the base member itself, or to sever the tether member or the connecting portion of the clip member thereof, the tether member is not separable by force applied to the distal end of the tether member.

Further, should the anchor member somehow be torn from the dorsal side, of the clip member somehow break at the connecting portion, the proximal end of the tether member would still need to fit through the elongate aperture before the tether member separated from the base member as a whole, thereby preserving tethered items connected therewith, even where the anchor member fails. The ribbon-like tether member, having a width or resilient material or fabric, is likewise unlikely to snap under the forces applied to the distal end of the tether member by an infant engaging an item connected thereto.

These features of the invention therefore enable a more secure means of maintaining the tether member coupled to the base member, to prevent inadvertent separation therefrom. Nonetheless, the instant configuration of parts enables easy decoupling of the clip member from the anchor member when desired. A user simply pulls the clip member upwards (in a direction away from the aperture) to disengage a connecting portion of the clip member from the anchor member, as will be described below.

The apparatus therefore provides a convenient means of tethering various accoutrements, accessories, and/or toys to a base member in a relatively secure fashion while enabling attachment of the base member between different totes and objects (such as a handle or lever arm of a stroller, for example) and allowing for convenient and easy decoupling of items when desired.

With the foregoing in mind, we now proceed to describe an example embodiment of the instant invention that demonstrates particularly the mode and manner of use of the apparatus, its constituent and important parts, and the useful improvements the invention contributes to the relevant art.

Objects of the present strap attachable accessory tether apparatus and method of use, along with various novel features that characterize the invention are particularly pointed out in the claims forming a part of this disclosure. For better understanding of the strap attachable accessory tether apparatus and method of use, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 2:
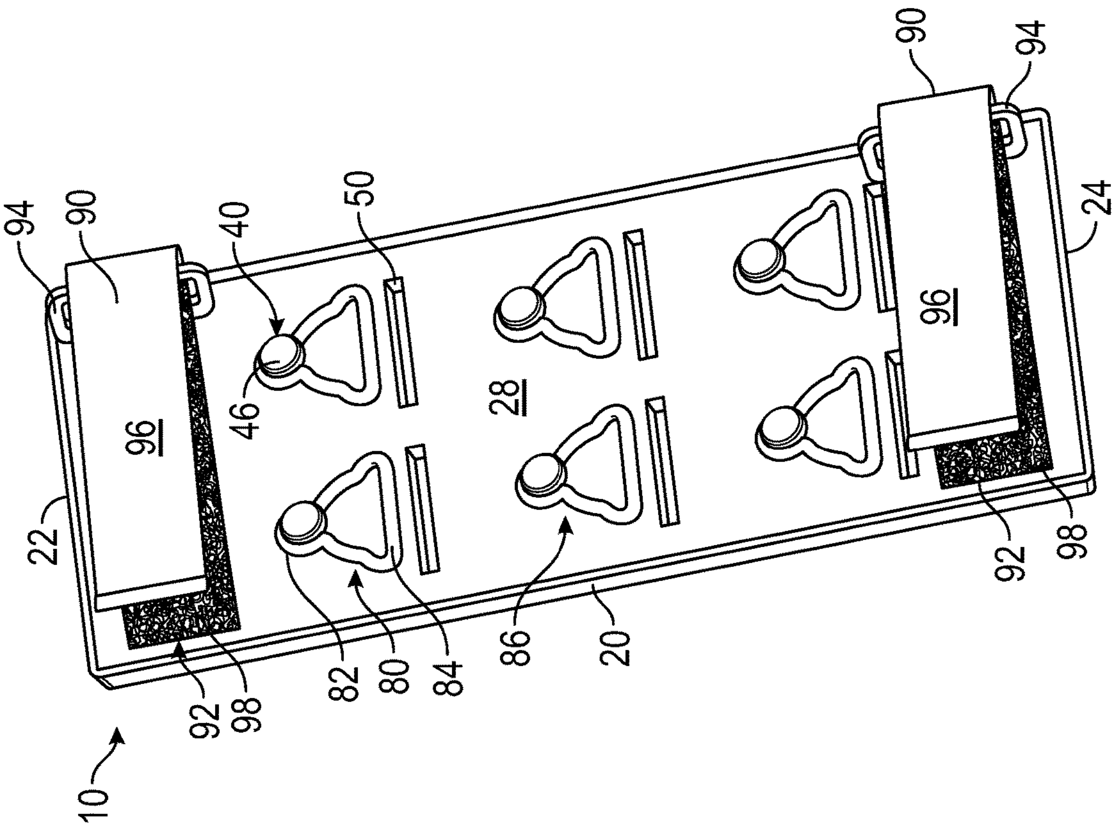
FIG. 2 is an elevation view of an example embodiment of a basal side of the strap attachable accessory tether apparatus illustrating a plurality of clip members connected to anchor members thereon.

With reference now to the drawings, and in particular FIGS. 1 through 9 thereof, example of the instant strap attachable accessory tether apparatus and method of use employing the principles and concepts of the present strap attachable accessory tether apparatus and method of use and generally designated by the reference number 10 will be described. The accompanying drawings are included as examples only, meant to illustrate the overall metes and bounds of the inventive concept and are not taken as limiting but exemplary—equivalence between structures and features applicable where within the contemplation of a person of ordinary skill in the relevant art to which this invention pertains.

Referring to FIGS. 1 through 9 a preferred embodiment of the present strap attachable accessory tether apparatus and method of use 10 is illustrated.

The present strap attachable accessory tether apparatus 10 has been devised to enable a means of porting accessories, accoutrements, teethers, and toys, collectively 100, useful in childcare, upon or about the person in a convenient, hygienic, and accessible manner. Extant toys, teethers, accessories and accoutrements 100 are tetherable to distal ends 74 of tether members 70 to prevent falling. The tether members 70 are releasably securable to a basal side 28 of the apparatus 10 in a way devised to distribute force applied to the tether member 70 into the base member 20 as well as an anchor member 40 by means of passing the tether member 70 through an elongate aperture 50 and fastening a proximal end 72 at right angles to the direction of passage, whereby force applied the distal end 74 of the tether member 70 is borne, at least partially, upon the rim 52 of the elongate member 50 and the basal side 28 of the base member 20 where contacted by the tether member 70, and is therefore distributed into the base member 20 proper before applying to the anchor member 40, as will be described subsequently. Further, removal of the tether member 70 from engagement with the associated anchor member 40 is readily effectuated by lifting a clip member 80 in a direction away from the associated elongate aperture 50, whereby the clip member 80 is disengaged and readily removed from the anchor member 40. Force applied to the tether member 70 serves to further tighten engagement of the clip member 80 to the anchor member 40, as will be described subsequently, whereby inadvertent removal of the tether member 70 (and any accessory 100 attached thereto) is unlikely.

Figure 1:
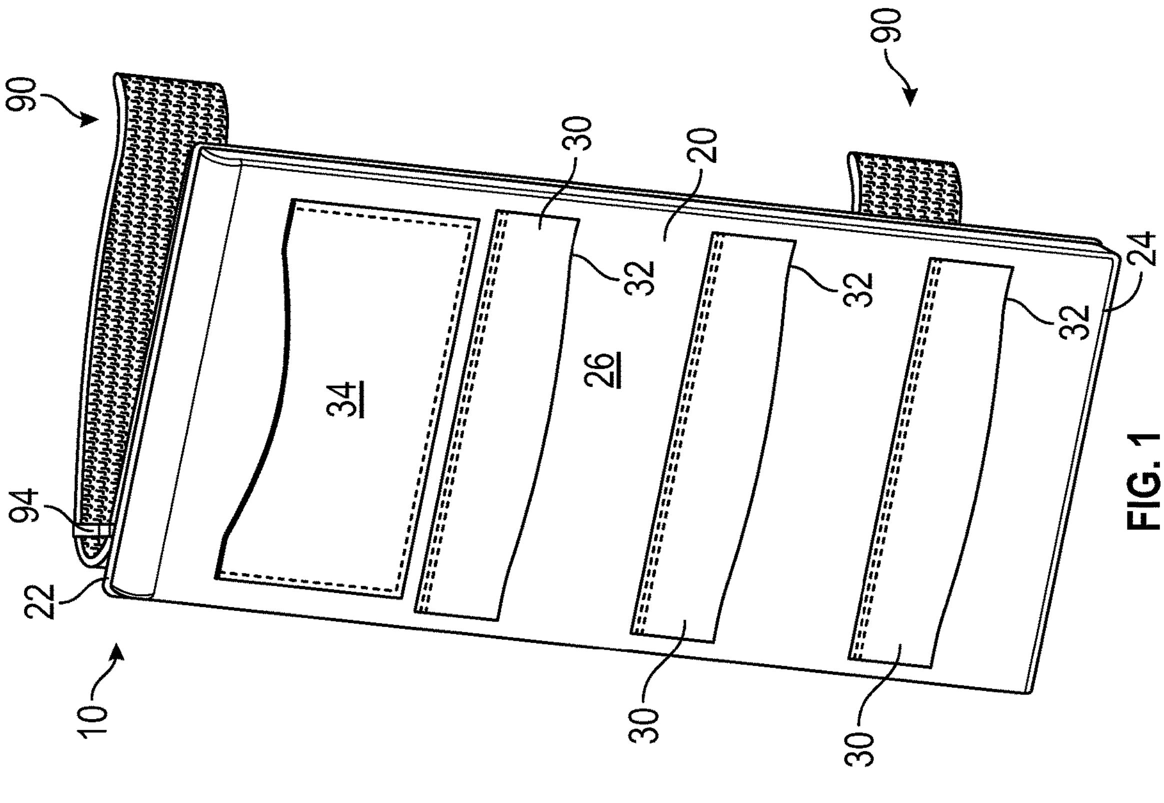
FIG. 1 is an elevation view of an example embodiment of a dorsal side of the strap attachable accessory tether apparatus.

Referring now to FIG. 1, an example embodiment of the instant strap attachable accessory tether apparatus 10 is illustrated in elevation. Strap attachable accessory tether apparatus 10 has a base member 20, here shown as a generally parallelepiped body having an upper end 22 and a lower end 24, a dorsal side 26 and a basal side 28. Base member 20 may be manufactured of lightweight, durable material, and may include foam, foam-board, polymer, elastomer, plastic, wood, or other such materials suited for the purpose, preference given to lightweight durability overall.

Visible upon dorsal side 26 are a plurality of flap members 30, disposed transversely upon dorsal side 26. Flap members 30 are secured along an upper seam thereof, with lower edge 32 unattached. Flap members 30 are devised to conceal elongate apertures 50 (see, e.g., FIG. 2) where through tether members 70 are securable (see, e.g., FIG. 6). Flap members

30 evince an ordered appearance of the apparatus 10 and may include branding or other design elements.

Pocket member 34 is disposed proximal upper end 22 of the base member 20. Pocket member 34 is open-topped and seamed along three-sides whereby an interior volume is contained, accessible for porting additional accoutrements and accessories as may be useful to port therein.

Attachment members 90 are disposed upon the basal side 28 for securement of the base member 20 to a strap of an existing tote 500, or other suitable structure as case may be. In the example embodiment illustrated, attachment members 90 are hook and loop fasteners, however any suitable attachment means as appropriate for fulfilling the required function set forth herein is considered to be within the general scope of this disclosure.

FIG. 2 illustrates an example embodiment of the base member 20 in elevation view of the basal side 28. Basal side 28 includes projecting portions 44 of anchor members 40 disposed therethrough, said projecting portions 44 protruding above the surface of basal side 28 a distance appropriate to tautly accommodate and engage with connecting portions 82 of corresponding clip members 80. See, e.g., FIGS. 5 and 6.

In this example embodiment depicted, each clip member 80 is a generally triangular body. Connecting portion 82 is disposed at one vertex opposite a trapeze member 84. The proximal end 72 of an associated tether member 72 is engaged around this trapeze member 84 (see, e.g., FIG. 6), as will be described subsequently.

Each anchor member 40 is disposed in spaced relation above a corresponding elongate aperture 50. Importantly, in this example embodiment depicted herein, the trapeze member 84 is sized to fit through elongate aperture 50 whereby each clip member 80 is insertable through its corresponding elongate aperture 50 for engagement with the corresponding anchor member 40 upon the basal side 28 of base member 20. Resultantly, tether members 70 are connectable to the basal side 28 by threading the tether member 70 through the elongate aperture 50 after connection to the trapeze member 84.

In this example embodiment, attachment members 90 are strip-like hook and loop fasteners, secured to the basal side 28 at one side, at seam 92. Each attachment member 90 is then threadable through hasp member 94, for doubled-back fastening. Such an arrangement enables taut engagement to straps and other objects of differing thickness. Each attachment member 90 may be pulled to tautly engage the base member 20 to the object over which the attachment members 90 are releasably fastened. The general length of hook portion 96 in relation to loop portion 98 yields an area of contact engagement that secures the base member 20 in position to prevent inadvertent disengagement in use over a range of different sized substrates.

Figure 3:
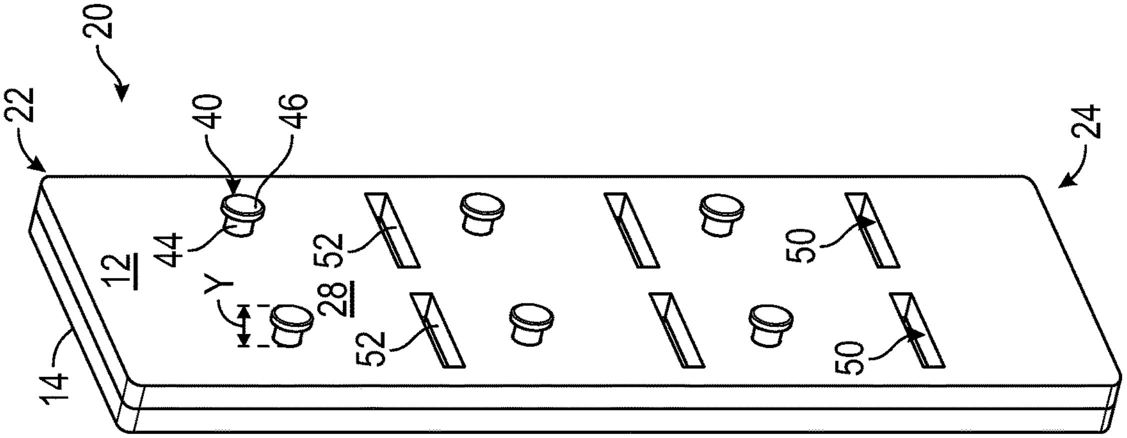
FIG. 3 an elevation view of an example embodiment of a base member of the strap attachable accessory tether apparatus, illustrating projecting portions of the plurality of anchor member shown in FIG. 2 disposed projected above the basal side in proximal relation to an associated elongate aperture.

FIG. 3 illustrates an example embodiment of a detail view of the base member 20 in elevation, with the attachment members 90 removed. This is to better illustrate an example embodiment wherein the base member 20 includes two parts—a basal part 12 and a dorsal part 14—conjoined, one superimposed upon the other. In FIG. 3, the distance y that projecting portions 44 are disposed overtop the basal side 20 is emphasized.

Figure 4:
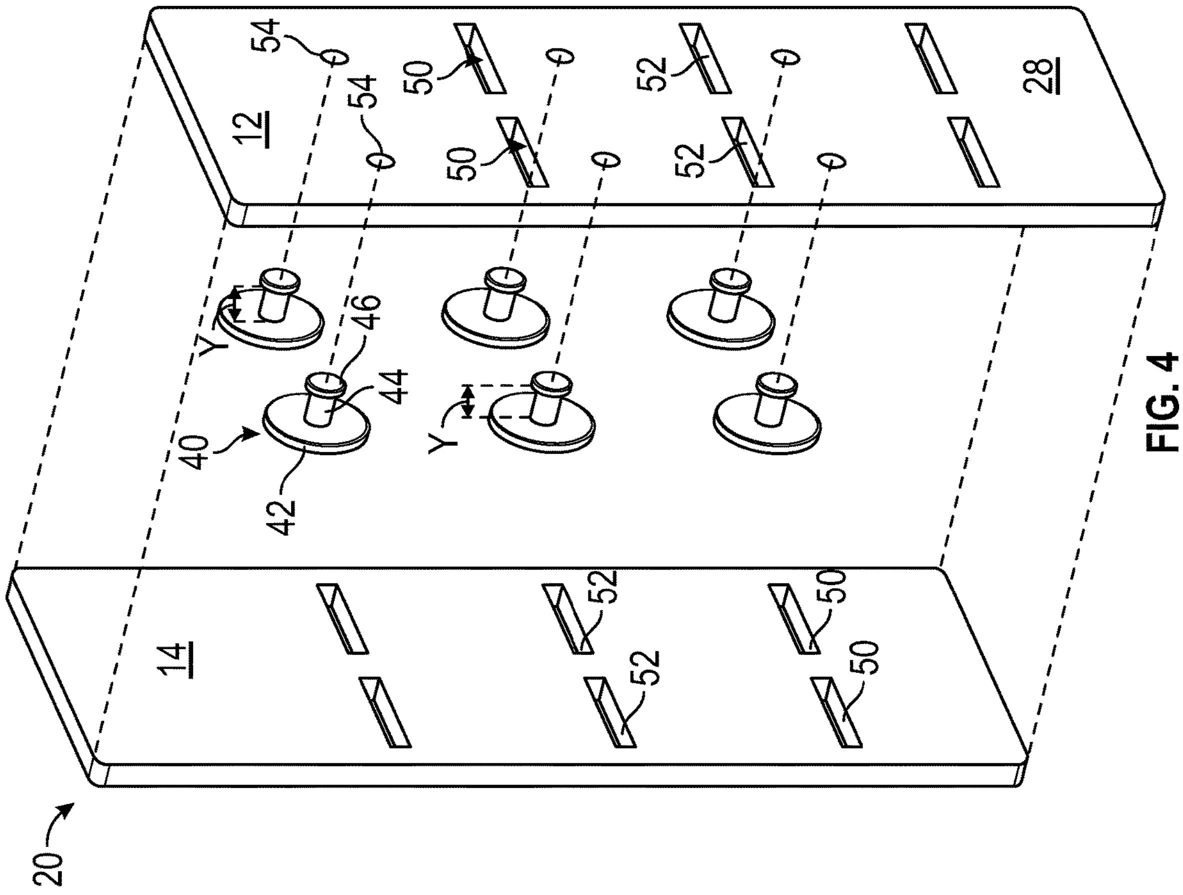
FIG. 4 is an exploded view of an example embodiment of a base member of the strap attachable accessory tether apparatus of FIG. 3, illustrating base portions of each of the the plurality of anchor members, said plurality of anchor members secured between basal and dorsal portions of the base member.

FIG. 4 illustrates the example embodiment of base member 20 depicted in FIG. 3 in exploded view, revealing anchor members 40 base portions 42 and projecting portions 44. In this example embodiment a means of manufacturing the base member 20 and securing anchor members 40 interior to the base member 20 is shown. Each projecting portion 44 is mounted through a corresponding hole 54 such that base portion is caused to engage against the basal part 12. Dorsal part 14 is then fitted to enclose the anchor member 40 base portions 42 interior to the base member 20 proper. Dorsal part 14 may be fused to basal part 12, glued, adhered, riveted, or stitching to ensure a strong bond whereby the anchor members 40 are secured interior to the assembled base member 20. Additional reinforcing elements and parts may be included around the anchor member 40 to securely mount the anchor member 40 interior to the base member 20—especially where the base member 20 is rendered of lightweight material such as foam. Thus portions of the dorsal and/or basal part 12, 14 may include more rigid and durable elements whereby each anchor member 40 is prevented from erupting form the base member 20 during usage. Additional shaped base portions 42 are also contemplated as part of this disclosure, including a base portion 42 common to more than one projecting portion 44, as where a parallelepiped base portion 42 is adapted to superimpose over the dorsal part 14 and present a plurality of projecting portions 44 through each of the holes 54 disposed through the basal part 12.

Dorsal part 14 and basal part 12 are fitted together to ensure that elongate apertures 50 are properly aligned. Elongate apertures 50 therefore present a throughway from the dorsal side 26 to the basal side 28.

Figure 5:
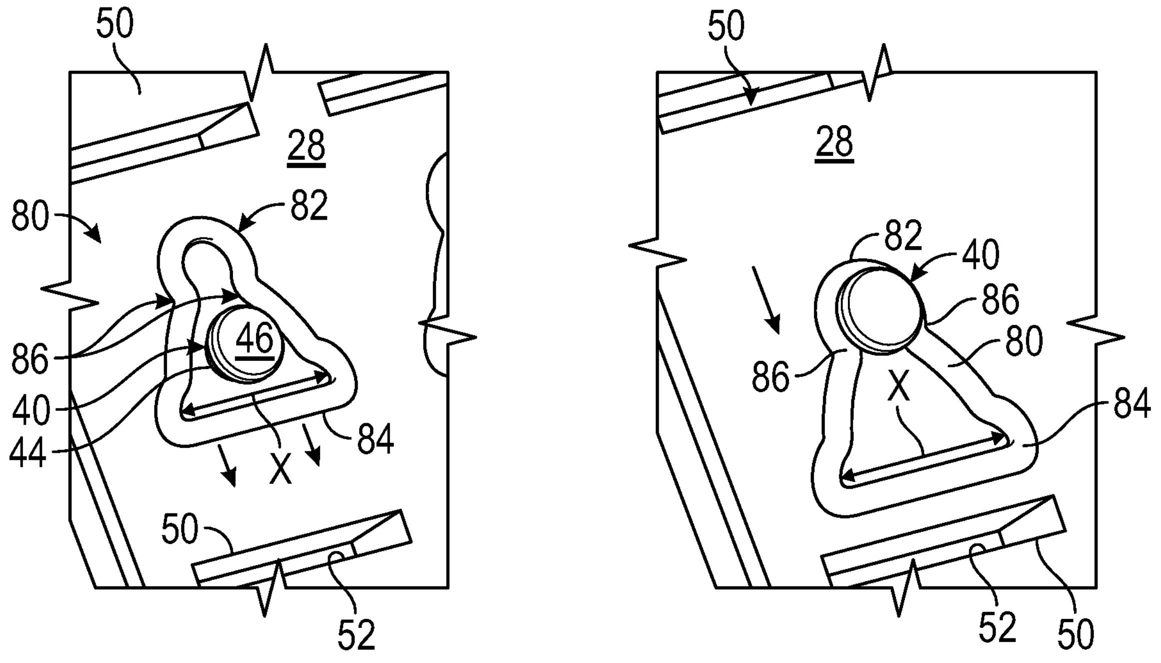
FIG. 5 is a detail view of an example embodiment of a clip member positioning to engage with a projecting portion of an anchor member upon the basal side of the base member.

FIG. 5 illustrates the means of coupling a clip member 80 to an anchor member 40. Tether members 70 have been omitted to maintain visibility of the anchor member 40 and elongate aperture 50 for the purposes of illustration. Triangular clip member 80 is positioned over the projecting portion 44, with connecting portion 82 disposed above the projecting portion 44. Once positioned, the clip member 80 is moved downwards, in the direction toward the elongate aperture 50, to engage connecting portion 82 around the projecting portion 44 of the corresponding anchor member 40. Tensility of the connecting portion 82, here shown as a C-shape, may cause the connecting portion 82 to snap into place around the projecting portion 44. Crimped perimeter 86 acts as a narrows; distance x is less than the outer diameter of the shaft of the projecting portion 44. Crimped perimeter 86 is therefore widened at least some capacity when pushed against projecting portion 44. Projecting portion 44 then seats into connecting portion 82, and the crimped perimeter 86 fastens thereabouts to releasably secure the clip member 80 to the anchor member 40. When fastened to the anchor member 40, connecting portion 82 is positioned with trapeze member 84 proximally spaced-apart from and in parallel with elongate aperture 50. End cap 46 prevents removal of the connecting portion 82 in a direction normal the basal side 20.

Figure 6:
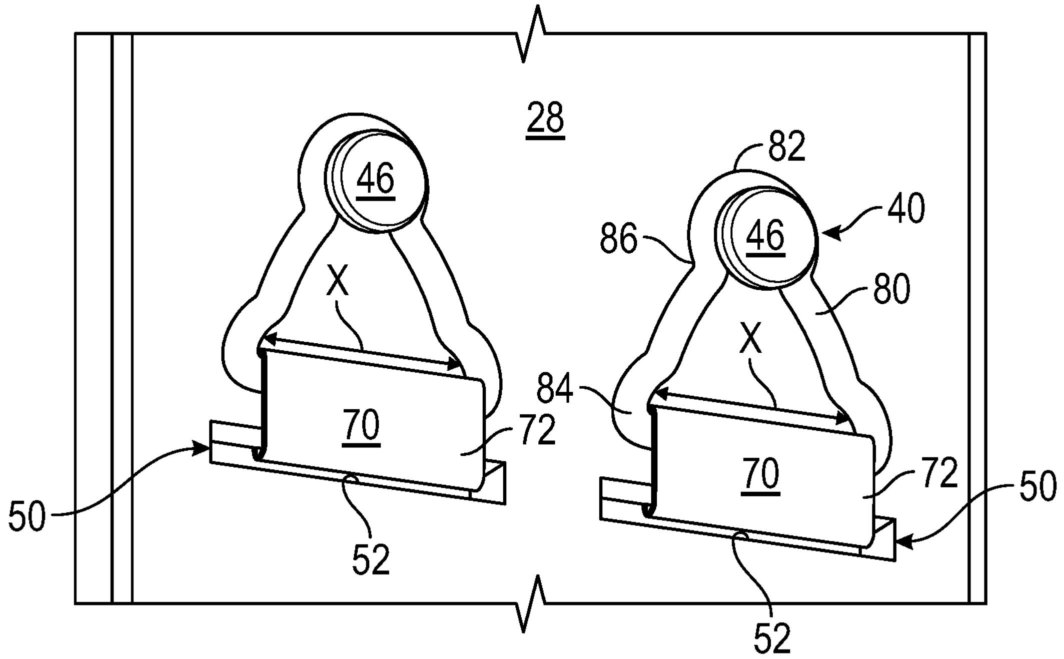
FIG. 6 is a detail view of an example embodiment of a pair of clip members engaged to a corresponding anchor member and a proximal end of a tether member.

As shown in FIG. 6, proximal end 72 of tether member 70 is fastened to trapeze member 84. Tether member 70 may be stitched to trapeze member 84, affixed, or otherwise releasably securable to the trapeze member 84. In the example embodiment depicted in FIG. 6, the tether member 70 is ribbon-like—that is, comprises a width approximate to the internal length x of the trapeze member 84 of the clip member 80. Proximal end 72 of tether member 70 is thus readily threaded through elongate aperture 50 from the dorsal side 26 of base member 20 through to the basal side 28, and thence turned to engage with the associated anchor member 40. As should be clear to a person of ordinary skill in the relevant art to which this invention pertains, this arrangement of parts enables force, applied to distal end 74 of tether member 70 (see FIG. 8) to be distributed along rim 52 of the elongate aperture 50 and into the base member 20 proper as well as against the anchor member 40. Further, force directed to pull on the distal end 72 of the tether member 70 is directed to pull the connecting portion 82 of the clip member 80 further into contact around the projecting portion 44 of the anchor member 40. Thus, inadvertent separation of the clip member 80 and anchor member 40 is unlikely to be effectuated by force applied to the distal end 74 of the tether member 70 by an infant playing with an accessory 100 attached thereto.

It should be readily apprehended that removal of the tether member 70 is conveniently effectuated by causing the clip member 80 to move upwards, in a direction away from the associated elongate aperture 50, to disengage the connecting portion 82 from engagement around the projecting portion 44 of the anchor member 40. In the example embodiment shown, such movement again forces the crimped perimeter 86 into contact with the shaft of the projecting portion 44, and some force is required to move the crimped perimeter 86 past the projecting portion 44.

Figure 7:
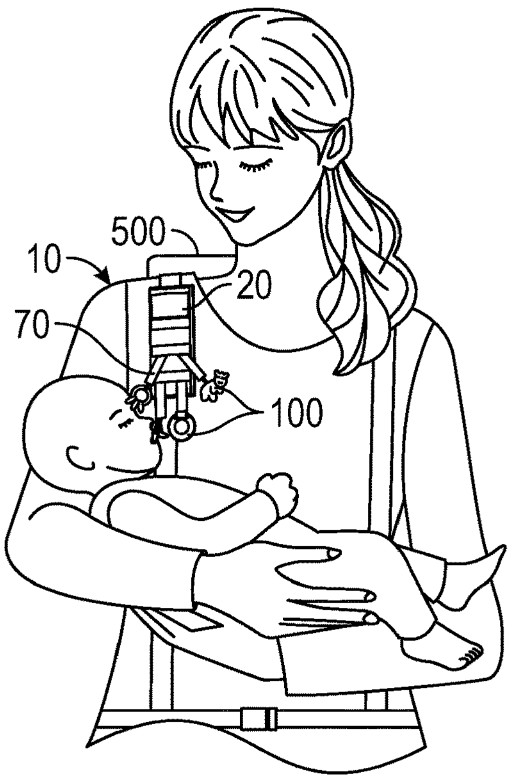
FIG. 7 is an in-use view of an example embodiment attached to the strap of a tote ported by a user while carrying an infant.

FIG. 7 illustrates an example embodiment in-use attached to a strap of an existing tote 500. The tether members 70 depend from the dorsal side 26 for ready access by an infant carried, in this example, in the arms of the user. The child is able to avail itself of teether or toy or pacifier, in this example.

Figure 8:
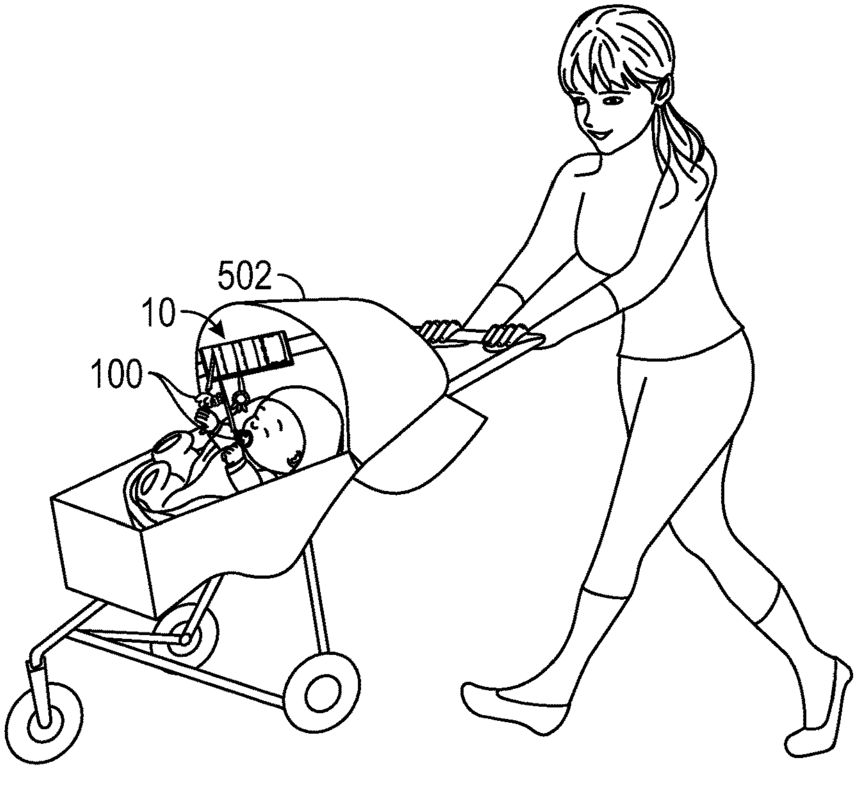
FIG. 8 is an in-use view of an example embodiment attached to a transverse strut or strap of a stroller.

FIG. 8 illustrates an example embodiment in-use attached to a transverse strut, strap or other secure body upon a stroller 502 during use by a user. The infant in the stroller 502 is therefore diverted by the toys depending from the base member in this example.

Figure 9:
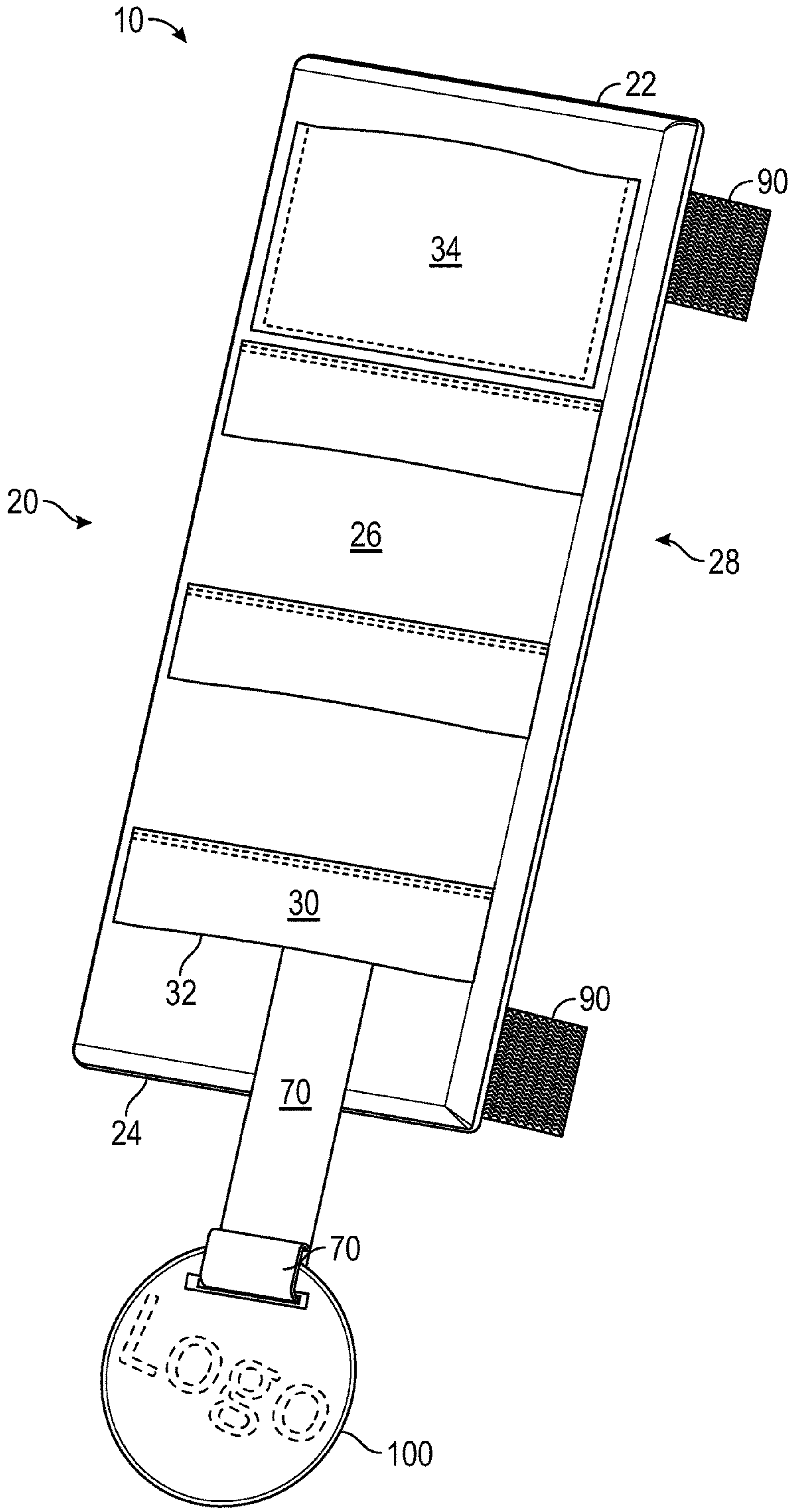
FIG. 9 is an elevation view of an example embodiment of a dorsal side of the base member having one tether member installed through the associated elongate aperture and secured to the basal side in the manner shown in FIG. 7. Each of the elongate apertures are concealed behind an associated flap member which is unattached along a bottom seam whereby the tether member may be depended therefrom.

FIG. 9 illustrates an elevation view of the dorsal side 26 of an example embodiment of the present apparatus. In this example, only one tether member 70 has been installed, and is shown depending from out an elongate aperture 50 concealed behind flap member 30. In this example embodiment, the accessory attached at the tether member 70 distal end 74 may include a branding element.

What is claimed is:

1. A strap attachable accessory tether apparatus comprising:

- a base member having a dorsal side and a basal side;
- at least one attachment member disposed upon the base member, said at least one attachment member configurable to secure the base member to a strap of an existing tote or other limb of an existing object;
- at least one aperture disposed through the base member from the basal side through to the dorsal side;
- an anchor member associated with each at least one aperture, said anchor member having:
  - a base portion coupled with the base member proximal the at least one aperture;
  - a projecting portion disposed projected perpendicularly upon the base portion, said projecting portion projected a definite distance above the base member basal side in spaced relation to the at least one aperture;
- a tether member sized for threadable insert through the at least one aperture, said tether member having a proximal end and a distal end; and
- a clip member, said clip member having at least a connecting portion and a trapeze member, said connecting portion configured to releasably engage around the projecting portion of the anchor member and said trapeze member configured for engagement with the proximal end of the tether member;
- wherein the tether member proximal end is securable to the trapeze member and the clip member and thence threadable through the at least one aperture to releasably connect with the projecting portion of the anchor member upon the basal side of the base member such that the distal end of the tether is positioned over top the dorsal side of the base member, whereby existing accoutrements or accessories attachable at the distal end of the tether member are maintained proximal the base member dorsal side and force exerted upon the tether member during carriage of the accoutrements or accessories is borne at the base member aperture, distributed into the base member, and at the anchor member.

2. The strap attachable accessory tether apparatus of claim 1 wherein the clip member is generally triangular in shape whereby the connecting portion is disposed at a vertex and the trapeze member is disposed opposite the connecting portion.

3. The strap attachable accessory tether apparatus of claim 2 wherein the clip member connecting portion is rounded to circumferentially gird and engage around the projecting portion of the base member.

4. The strap attachable accessory tether apparatus of claim 3 wherein each at least one aperture is rectangularly shaped as a narrow slot.

5. The strap attachable accessory tether apparatus of claim 4 wherein the tether member is a rectilinear member whereby a width of the tether member distributes the force exerted against the tether member during portage of the accoutrements or accessories along the length of the aperture and against the basal side of the base member.

6. The strap attachable accessory tether apparatus of claim 5 wherein the base member further comprises a flap member disposed upon the dorsal side in relation to each at least one aperture, said flap member concealing said at least one aperture from view.

7. The strap attachable accessory tether apparatus of claim 6 wherein the base member further comprises at least one pocket member disposed upon the dorsal side.

8. The strap attachable accessory tether apparatus of claim 7 wherein the at least one attachment member comprises at least a pair of attachment members securable by means of hook and loop fasteners engaging around the strap of the tote or the limb of the object.

9. In a strap attachable accessory tether apparatus having a base member for securable engagement to an existing strap or other limb or support of an existing object, a method of depending accessories comprising the steps of:

- attaching a proximal end of a tether member around a trapeze member of an associated clip member, said trapeze member having an inner length matched to the width of the tether member and an outer length matched to the length of a corresponding elongate aperture, which said aperture is disposed in the base member to present a throughway from a dorsal side of the base member to a basal side thereof;
- using the clip member to thread the tether member proximal end through the elongate aperture;
- engaging the clip member around a projecting portion of an anchor member disposed upon the basal side, said projecting portion disposed protruding above the basal side spaced-apart from and in relation to the elongate aperture, said clip member having a connecting portion devised to releasably engage to the said projecting portion; and
- pulling the clip member in the direction towards the elongate aperture to engage the clip member in position releasably secured to the anchor member;

wherein force directed to a distal end of the tether member is distributed into the base member in contact with the tether member upon the basal side and through the aperture and the connecting portion is forced more tautly against the projecting portion of the anchor member, whereby uncoupling of the clip member from the anchor member is prevented by force applied to the distal end of the tether member but uncoupling the clip member is effectuated by pulling the proximal end of the tether and/or clip member in a direction away from the elongate aperture.

* * * * *